United States Patent Office
3,030,408
Patented Apr. 17, 1962

3,030,408
PERCHLORYL FLUORIDE PROCESS FOR FLUORINATION OF ACTIVE HYDROGEN COMPOUNDS
Charles E. Inman, Glenside, Robert E. Oesterling, Flourtown, and Edward A. Tyczkowski, Abington, Pa., assignors to Pennsalt Chemicals Corporation, Philadelphia, Pa., a corporation of Pennsylvania
No Drawing. Filed Sept. 22, 1958, Ser. No. 762,248
14 Claims. (Cl. 260—475)

This invention relates to a novel method for preparing fluorinated organic compounds and to the novel compounds formed thereby. More particularly, this invention relates to the fluorination of an active hydrogen compound with perchloryl fluoride.

Perchloryl fluoride, $ClO_3F$, whose structural formula is

is a stable fluorine derivative of perchloric acid. (H. Bode and E. Klesper, Z. Anorg. u Allgem Chem., 225, 275 (1951), and A. Engelbrecht and H. Atzwanger, Monatsh. 83, 1087 (1952).) Its chemical reactivity with organic compounds has heretofore been unknown.

We have now found that the alpha hydrogen atoms of an active hydrogen compound (an organic compound containing active hydrogen) can be replaced readily by fluorine atoms by contacting said active hydrogen compound with an alkali metal base and with perchloryl fluoride in an inert diluent which is substantially non-reactive under the conditions existing in the reaction zone at a temperature below 250° C. until reaction therebetween substantially occurs to form the fluorinated derivative of the active hydrogen compound, which is then recovered from the reaction mass.

An active hydrogen compound is defined in the art as an organic compound whose essential structural feature comprises a carbon atom to which is attached by covalent attachment at least one hydrogen atom and at least one functional group, or common electron-accepting group, such as carbonyl, nitrile, nitro, etc. (Reynold C. Fuson, "Advanced Organic Chemistry," John Wiley & Sons, Inc., N.Y. (1950), Chap. XVIII). The said carbon atom in said compound is defined as being in alpha position with respect to said functional group, and the hydrogen attached to the carbon is referred to as alpha, or active, hydrogen. The concept of active hydrogen is old in organic chemistry theory and has been defined in the art in terms of a form of chemical behavior characteristic of active hydrogen compounds. According to theory dealing with the structure and reactivity of organic compounds, the polarity of the electron-accepting group furnishes the driving force for the increased activity of the hydrogen.

Halogenation of an active hydrogen compound to replace the alpha hydrogen with iodine, chlorine and bromine is old in the art. Two methods are known in the art for the substitution of iodine, chlorine and bromine for the alpha hydrogen of an active hydrogen compound. In the first of these methods, the organic compound is treated with molecular halogen, e.g., $I_2$, $Cl_2$ or $Br_2$, in the presence of a catalyst, such as the halides of sulfur and phosphorus, or sunlight. In the second method, the said organic compound is treated with the said molecular halogen in the presence of an alkali, e.g., alcoholic KOH, to form the halogenated compound.

Unlike halogenation with the other halogens, direct halogenation of an active hydrogen compound with fluorine is not practical because of the high reactivity of fluorine. Fluorination, as for example with elemental $F_2$, results in the replacement not only of the alpha hydrogen atoms of an alpha carbon of the compound but also in the introduction of fluorine into the functional group or groups present. Cleavage of the C to C bonds may also result. It is known in the art that a fluorinated active hydrogen compound can be made by an indirect method involving a number of steps. For example, Henne and DeWitt, J. Am. Chem. Soc. 70, 1548 (1948), describe a procedure whereby they prepare difluoromalonic acid and some of its derivatives from malonic acid, a typical active hydrogen compound, by a multiple step process including chlorination, fluorination, dehydrochlorination and oxidation.

In contrast the reaction involved in our invention is quite simple, as shown below in a typical reaction using diethyl malonate as the active hydrogen compound, sodium ethylate as the alkali metal base, perchloryl fluoride as the fluorinating agent, and ethanol as the inert diluent:

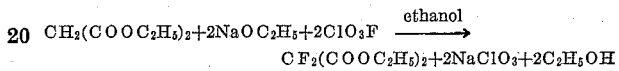

Although not a strictly accurate statement of the mechanism, the reaction may be visualized as taking place in two steps, sodium from the base first replacing active hydrogen, and fluorine then replacing the sodium.

The fluorination method of our invention is broadly applicable to replacing with fluorine the alpha hydrogen atoms of an active hydrogen compound having the formula

wherein R, Q, and T represent hydrogen; or an aliphatic radical of not more than 12 carbon atoms, the carbon skeleton of which has attached to it radicals selected from the group consisting of hydrogen and halogen; or a functional group sufficiently electro-negative to render said active hydrogen compound capable of forming an alkali metal substituent of said compound by replacement of said alpha hydrogen atoms with alkali metal atoms; and at least two of R, Q, and T are said functional group.

Examples of the said functional groups R, Q, and T which may be present in the active hydrogen compound reactant,

and in the final fluoro-organic product include

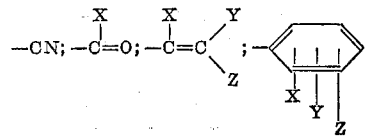

wherein X, Y, and Z represent hydrogen, halogen, phenyl, or an aliphatic radical of not more than 3 carbon atoms, the carbon skeleton of which has attached to it radicals selected from the group consisting of hydrogen and halogen.

Examples of active hydrogen compounds which may be fluorinated by the method of our invention include diketones, β-ketoesters, diesters, β-thioketoesters, nitriles, nitroalkanes, and cycloalkadiene compounds.

The perchloryl fluoride used in practicing our invention may be prepared by any means known to the art, such as by reacting potassium chlorate with elemental fluorine or by electrolysis of sodium perchlorate in anhydrous hydrofluoric acid, as described in the references cited above.

The alkali metal base used in practicing our invention may be an alkali metal, or the alkoxide, hydroxide, hydride or amide of an alkali metal. Examples of alkali metals are sodium, potassium and lithium. Examples of alkali metal alkoxides are sodium methoxide; sodium ethoxide; which is preferred; sodium propoxide; sodium butoxide; potassium methoxide; potassium ethoxide; potassium propoxide; lithium methoxide; lithium ethoxide; lithium propoxide; and lithium butoxide. Examples of alkali metal hydrides are sodium hydride, potassium hydride, and lithium hydride. Examples of alkali metal hydroxides are sodium hydroxide, which is preferred; potassium hydroxide; and lithium hydroxide. Examples of alkali metal amides are sodium amide, which is preferred; potassium amide; and lithium amide.

It is necessary that the base used in carrying out our invention have sufficient basicity to remove the alpha hydrogen, which is acidic in character, from a particular active hydrogen compound. The degree of basicity required by the alkali metal base is predictable from the acidity of the alpha hydrogen of the active hydrogen compound. As is well known in the field of organic chemistry, the acidic character of an alpha hydrogen is dependent on the number of functional groups attached to the alpha carbon. The relative basicity of the alkali metal bases is also well-known. Thus, the amides are more basic than the alkoxides, which in turn are more basic than the hydroxides. In selecting the base to use with a particular active hydrogen compound for practicing our invention, a strong base is selected for use with a weakly acidic active hydrogen compound and a weak base is selected for use with a strongly acidic active hydrogen compound.

The reactions of this invention are carried out in a non-aqueous solvent or diluent which preferably is inert to the reactants and to the products formed. Examples of such solvents and diluents are methanol, ethanol, isopropanol, petroleum ether, and liquid aliphatic hydrocarbons, e.g., hexane, ligroin, etc. However, the active hydrogen compound, when it is a liquid, can act as its own solvent.

In the practice of our invention it has been found that where a compound possesses more than one alpha hydrogen atom substantially all the alpha hydrogen atoms of a particular active hydrogen compound will be replaced by fluorine atoms in a particular molecule, to the extent that an adequate amount of alkali metal base and an equivalent amount of perchloryl fluoride are present, before replacement of the alpha hydrogen atoms on the next molecule begins. For example, if one mole of diethyl malonate, $CH_2(COOC_2H_5)_2$, if contacted with two moles of sodium ethylate and one mole of perchloryl fluoride in accordance with our method, one-half mole of diethyl-difluoro malonate, $CF_2(COOC_2H_5)_2$, is formed rather than one mole of diethylfluoro malonate, $$CHF(COOC_2H_5)_2$$

This result is inherent in the chemistry of active hydrogen compounds. Therefore, in practicing our invention it is advantageous to use at least one mole of perchloryl fluoride and one mole of alkali metal base for each active hydrogen atom present per mole of the active hydrogen compound. When only one active hydrogen atom is present, the ratio of moles of perchloryl fluoride and of alkali metal base to moles of the active hydrogen compound required will be 1:1:1; for two active hydrogens, the ratio required will be 2:2:1; and for three active hydrogens, the ratio required will be 3:3:1.

The amount of solvent or diluent, when one is used, must be sufficiently adequate, at the beginning of the reaction, to permit substantial solution or suspension of the active hydrogen compound in the diluent. Under the conditions existing at the end of the reaction the amount of solvent used should be sufficiently adequate to permit easy agitation and transfer of the mixture of liquid and solid products present. The amount of solvent which may be used in not otherwise restricted and may be from about 3 parts by weight to about 15 parts by weight of solvent to 1 part of active hydrogen compound. This means that when the active hydrogen compound itself acts as solvent, it is used in 3-fold or more excess over the other reactants. Preferably about 4 to 10 parts by weight of solvent are used per part of active hydrogen compound.

The alkali metal salt of the active hydrogen compound may advantageously in some cases, where it is substantially stable enough to permit doing so, be prepared well in advance of the fluorination reaction by reacting the active hydrogen compound with an alkali metal base in the same type of solvent or diluent that is used for the fluorination step by dissolving or suspending the active hydrogen compound in the liquid medium and then adding said base. The alkali metal salt may then be separated for later use in the fluorination step, or it may be left in the liquid medium and perchloryl fluoride may be added directly to it. In an embodiment of our invention an alkali metal alcoholate is prepared in an alcohol solvent by addition of an alkali metal base to said alcohol. A stoichiometric amount of the active hydrogen compound is then gradually added to the solution of alkali metal alcoholate with agitation, followed by addition of at least a stoichiometric amount of perchloryl fluoride. Preferably the entire amount of the salt of the active hydrogen compound is prepared in the diluent in the reaction vessel before beginning the addition of perchloryl fluoride; however, a solution of the salt and a stream of perchloryl fluoride may be introduced into the diluent in the reactor vessel simultaneously in substantially stoichiometric amounts in order to maintain a readily controllable reaction rate and to promote efficient removal of the heat of reaction.

In practicing our invention, the perchloryl fluoride (B.P. −47.5° C.) may be added to the reaction mass in gaseous or liquified form, preferably the former. The rate of addition of the perchloryl fluoride should be sufficiently rapid to permit the reaction to proceed, but not so rapid as to permit appreciable amounts of the gas to pass unreacted out of the reaction vessel. In approaching the end of the reaction, the perchloryl fluoride is preferably passed into the reaction mass until the mass is rendered substantially neutral, as may be determined by test with an acid-base indicator.

The reactions involved in carrying out our invention are exothermic and it is necessary that the evolved heat of reaction be removed from the reactor system. It is desirable to keep the reaction mass at temperatures sufficiently high to cause reaction to proceed at a reasonable rate, but not so high as to cause undesired side reactions and/or decomposition of the reactants and product. Temperatures during reaction ranging from about −15° C. to about 250° C. are satisfactory, a preferred range being between 0° C. to 80° C. In many cases the reaction proceeds quite smoothly at ordinary temperatures, such as between 20° C. and 30° C. At ordinary temperatures water may be used as a heat transfer medium to cool the reaction vessel. At sub-zero temperatures an appropriate medium such as diethylene glycol may be used, and at elevated temperatures oil or a chemical heat transfer medium with suitable characteristics may be used.

Pressure is not critical and the reaction may be conducted at atmospheric pressure, sub-atmospheric pressure, or super-atmospheric pressure. Atmospheric pressure is more convenient and is frequently preferred.

The reaction may be conducted in a vessel in batch-wise fashion. In such a case agitation of the reaction mixture is beneficial in increasing the rate of reaction and facilitating heat transfer. The reaction may be carried out in a semi-continuous manner in a series of connected vessels wherein the active hydrogen compound is contacted with the alkali metal base in the first vessel and the resulting intermediate compound is passed to one or more vessels for treatment with perchloryl fluoride. The process may also be conducted in a continuous manner by introducing the reactants continuously into a tower or pipe system wherein they are circulated and from which product is continuously withdrawn.

By-product alkali metal chlorate is formed in the reactor vessel by combination of the alkali metal atoms released from the alkali metal base with the $-ClO_3$ portion of the perchloryl fluoride molecule. This by-product chlorate crystallizes and is recovered from the reaction liquid by suitable means of separation, such as filtration.

The following examples are presented for the purpose of illustrating the invention, it being understood that the invention is not intended to be restricted to the specific illustrative examples and that other specific modifications are included by the invention. The parts are by weight unless otherwise stated.

*Example 1*

100 parts of diethyl malonate were added to 200 parts of sodium ethylate in about 375 parts of absolute ethanol. The resulting solution was stirred and cooled in the range of 0–10° C. Perchloryl fluoride gas was then passed into it at about room temperature until the solution was substantially neutral to acid-base indicator. Sodium chloride precipitated from the solution as the reaction proceeded. The reaction mass was filtered and the filtrate distilled at atmospheric pressure. 103 parts of crude liquid diethyl 2,2-difluoro malonate product were recovered. The product was purified by distillation under reduced pressure.

The following physical constants were determined: B.P., 53° C./1 mm.; B.P. 184° C./atm.; $N_D^{20}$, 1.3800; d. 25° C., 1.162.

Chemical analysis gave the following results for the formula $C_7H_{10}F_2O_4$: Calculated—C, 42.86; H, 5.14; F, 19.37. Found—C, 43.13; H, 5.27; F, 17.20.

A comparison of the infrared spectra of the diethyl malonate starting material and of the product produced by the action of $ClO_3F$ on the diethyl malonate indicated the following:

The $>C=O$ ester band present in diethyl malonate at 5.71 and 5.76 μ (doublet) was found to be displaced to 5.62 μ (with a shoulder at 5.67 μ) in the reaction product, a shift consistent with that expected on substitution of F into an ester.

The reaction product spectrum showed strong absorption in the 8–9.5 μ region (at 8.7 μ and 9.37 μ), a region in which C—F containing compounds show strong absorption. Diethyl malonate does not show comparable strong absorption in this region. Thus, the $>C=O$ displacement and the strong bands in the C—F region indicate that F was now attached to the alpha carbon atom of the starting material, diethyl malonate.

*Example 2*

The identity of the compound of Example 1 was further confirmed by converting it into a known derivative, difluoro malonamide, as follows:

The diethyl 2,2-difluoro malonate made by the method of Example 1 was dissolved in anhydrous ethyl ether and treated with an excess of anhydrous ammonia. A white solid was recovered which upon recrystallization from ethanol gave white needles. On the basis of melting point and analysis the product was identified as difluoro malonamide; M.P. 200–201 C. (uncorrected). Henne and DeWitt, J. Am. Chem. Soc., 70, 1584 (1948), report M.P. 205° C., corrected, for this compound.

*Example 3*

Following the method of Example 1, 100 parts of ethylacetoacetate were added to about 250 parts of sodium ethylate in about 375 parts of absolute ethanol. Upon completion of the sodium ethylacetoacetate formation, perchloryl fluoride was passed into the mixture until the solution was substantially neutral. Ethyl-2,2-difluoroacetoacetate, a novel compound, was recovered as a colorless liquid, B.P. 168° C., $N_D^{20}$, 1.3975. Ethyl-2,2-difluoroacetoacetate is useful as an intermediate reactant in the preparation of fluorinated derivatives of pharmaceutical compounds normally prepared from acetoacetic acid.

*Example 4*

The identity of the ethyl-2,2-difluoroacetoacetate made in Example 3 was confirmed by converting the compound to its 2,4-dinitrophenylhydrazone derivative by reacting it with 2,4-dinitrophenylhydrazine. Yellow plate-form crystals melting at 106–107° C. were obtained. Analysis was as follows:

Calculated for $C_{12}H_{12}O_6N_4F_2$: C, 41.62; H, 3.49; F, 10.97; N, 16.18. Found: C, 41.89; H, 3.48; F, 9.56; N, 16.62.

*Example 5*

Sixty parts of diethyl-2-ethylmalonate were added to 23 parts of sodium ethylate in about 200 parts of ethanol. Perchloryl fluoride gas was passed into the mixture at about room temperature until the solution was substantially neutral. Diethyl-2-ethyl-2-fluoro malonate was recovered as a colorless liquid. B.P. 48° C./0.2 mm., $N_D^{20}=1.4121$. Analysis: Calculated for $C_9H_{15}FO_4$— M.W., 206; C, 52.42; H, 7.33. Found—C, 54.69; H, 7.31, M.W. 213.

*Example 6*

The identity of the diethyl-2-ethyl-2-fluoro malonate made in Example 5 was confirmed by converting it to a fluorinated derivative of barbituric acid.

5-ethyl-5-fluorobarbituric acid was formed from diethyl-2-ethyl-2-fluoro malonate according to the following reaction:

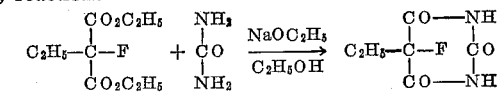

A 300 ml. stainless steel autoclave was charged with 2.62 g. of sodium in 70 ml. of absolute ethanol, 5.1 g. of anhydrous urea, 11.7 g. of diethyl-2-ethyl-2-fluoro malonate, and 30 ml. of absolute ethanol. The autoclave was heated at 122–128° C. for about 7 hours. It was then cooled. The reaction mixture was removed from the autoclave and was evaporated under vacuum to near dryness. The residual solid so obtained was treated with 20 ml. of 6 N HCl and about 20 ml. of water. The solid dissolved, but reformed after several days. 1.1 g. of solid 5-ethyl-5-fluorobarbituric acid was recovered. The solid was found soluble in 10% sodium carbonate solution, hot water, and hot isopropanol, and insoluble in 3 N HCl, benzene, cold water, and cold isopropanol. The 5-ethyl-5-fluorobarbituric acid product was purified by dissolving it in sodium carbonate solution and reprecipitating it with concentrated hydrochloric acid. The product melted at 204–205.5° C. Analysis: Calculated for $C_6H_7O$—N, 16.1; F, 10.9. Found—N, 16.25; F, 10.75. The product is useful, like barbituric acid derivatives and as an intermediate for organic synthesis.

*Example 7*

6.6 g. of $CH_2(CN)_2$ malononitrile and 5 g. of sodium metal were dissolved in 100 ml. of absolute ethanol. $ClO_3F$ gas was bubbled into the solution with stirring at a temperature of about 35° C. until the reaction mass became substantially neutral. The solvent was distilled off and the product was extracted with ether. The extract was dried over $MgSO_4$, filtered and concentrated under vacuum. The final product was identified as the fluorine derivative of the starting malononitrile by fusion with sodium metal followed by precipitation of the fluorine by $Ce(NO_3)_3$.

The process of our invention provides a means for substituting fluorine into the active methyl, methylene and methinyl group of a wide variety of compounds. The resulting products in many cases are compounds which previously were unknown and unavailable, but which now are for the first time disclosed as a result of our invention. Our process is thus advantageous for the preparation of known as well as novel compounds.

Following substantially the same procedure as described in Example 1, our method of fluorination using perchloryl fluoride as the fluorinating agent can be used advantageously for the fluorination of the active hydrogen compounds shown in the following examples.

In the examples, X, Y and Z, as previously described, represent hydrogen; halogen; phenyl or aliphatic radical of not more than 3 carbon atoms, the carbon skeleton of which has attached to it radicals selected from the group hydrogen and halogen.

| Example Number | Active Hydrogen Compound | Alkali Metal Base, Moles | Perchloryl Fluoride, Moles | Product |
|---|---|---|---|---|
| 8 | COOX<br>\|<br>CH$_2$<br>\|<br>COOY | 2NaOC$_2$H$_5$ | 2 | COOX<br>\|<br>CF$_2$<br>\|<br>COOY |
| 9 | COOC$_2$H$_5$<br>\|<br>CH$_2$<br>\|<br>COOCH$_3$ | 2NaOC$_2$H$_5$ | 2 | COOC$_2$H$_5$<br>\|<br>CF$_2$<br>\|<br>COOCH$_3$ |
| 10 | COOC$_2$H$_5$<br>\|<br>CH$_2$<br>\|<br>COOC$_3$H$_7$ | 2KOC$_2$H$_5$ | 2 | COOC$_2$H$_5$<br>\|<br>CF$_2$<br>\|<br>COOC$_3$H$_7$ |
| 11 | CN<br>\|<br>CH$_2$<br>\|<br>COOX | 2NaOCH$_3$ | 2 | CN<br>\|<br>CF$_2$<br>\|<br>COOX |
| 12 | CN<br>\|<br>CH$_2$<br>\|<br>COOH | 2NaOC$_2$H$_5$ | 2 | CN<br>\|<br>CF$_2$<br>\|<br>COOH |
| 13 | CN<br>\|<br>CH$_2$<br>\|<br>COOC$_2$H$_5$ | 2KOC$_2$H$_5$ | 2 | CN<br>\|<br>CF$_2$<br>\|<br>COOC$_2$H$_5$ |
| 14 | COOX<br>\|<br>H—C—C$_2$H$_5$<br>\|<br>COOY | KOCH$_3$ | 1 | COOX<br>\|<br>F—C—C$_2$H$_5$<br>\|<br>COOY |
| 15 | COOCH$_2$Cl<br>\|<br>H—C—CH$_3$<br>\|<br>COOC$_3$H$_7$ | NaOC$_3$H$_7$ | 1 | COOCH$_2$Cl<br>\|<br>F—C—CH$_3$<br>\|<br>COOC$_3$H$_7$ |
| 16 | COOX<br>\|<br>CH$_2$<br>\|<br>C—Y<br>\|\|<br>O | 2KNH$_2$ | 2 | COOX<br>\|<br>CF$_2$<br>\|<br>C—Y<br>\|\|<br>O |
| 17 | COOCH$_3$<br>\|<br>CH$_2$<br>\|<br>C—CH$_2$—CH$_2$—CHCl$_2$<br>\|\|<br>O | 2NaOC$_2$H$_5$ | 2 | COOCH$_3$<br>\|<br>CF$_2$<br>\|<br>C—CH$_2$—CH$_2$CHCl$_2$<br>\|\|<br>O |
| 18 | COOC$_3$H$_7$<br>\|<br>CH$_2$<br>\|<br>C—CH$_3$<br>\|\|<br>O | 2NaOC$_2$H$_5$ | 2 | COOC$_3$H$_7$<br>\|<br>CF$_2$<br>\|<br>C—CH$_3$<br>\|\|<br>O |
| 19 | CN<br>\|<br>CH$_2$<br>\|<br>COOCH$_3$ | 2NaOC$_2$H$_5$ | 2 | CN<br>\|<br>CF$_2$<br>\|<br>COOCH$_3$ |
| 20 | CN<br>\|<br>CH$_2$<br>\|<br>CN | 2NaOCH$_3$ | 2 | CN<br>\|<br>CF$_2$<br>\|<br>CN |
| 21 | COOX<br>\|<br>H—C—C$_6$H$_2$XYZ<br>\|<br>COOY | NaOC$_2$H$_5$ | 1 | COOX<br>\|<br>F—C—C$_6$H$_2$XYZ<br>\|<br>COOY |

| Example Number | Active Hydrogen Compound | Alkali Metal Base, Moles | Perchloryl Fluoride, Moles | Product |
|---|---|---|---|---|
| 22 | COOC$_2$H$_5$–CH(C$_6$H$_4$Cl)–COOC$_2$H$_5$ | NaOC$_2$H$_5$ | 1 | COOC$_2$H$_5$–CF(C$_6$H$_4$Cl)–COOC$_2$H$_5$ |
| 23 | COOC$_2$H$_5$–CH(COCH$_3$)–COOC$_2$H$_5$ | NaOC$_2$H$_5$ | 1 | COOC$_2$H$_5$–CF(COCH$_3$)–COOC$_2$H$_5$ |
| 24 | COOC$_2$H$_5$–CH(CH$_2$CH=CH$_2$)–COOC$_2$H$_5$ | NaOC$_2$H$_5$ | 1 | COOC$_2$H$_5$–CF(CH$_2$CH=CH$_2$)–COOC$_2$H$_5$ |
| 25 | NO$_2$–CH$_2$–COOX | 2NaOC$_2$H$_5$ | 2 | NO$_2$–CF$_2$–COOX |
| 26 | NO$_2$–CH$_2$–COOCH$_3$ | 2NaOC$_2$H$_5$ | 2 | NO$_2$–CF$_2$–COOCH$_3$ |
| 27 | NO$_2$–CH$_2$–CN | 2KOC$_3$H$_7$ | 2 | NO$_2$–CF$_2$–CN |
| 28 | CN–CH$_2$–C$_6$H$_5$ | 2NaOC$_2$H$_5$ | 2 | CN–CF$_2$–C$_6$H$_5$ |
| 29 | CN–CH$_2$–C$_6$H$_5$ | 2NaNH$_2$ | 2 | CN–CF$_2$–C$_6$H$_5$ |
| 30 | fluorene (CH$_2$) | 2NaOC$_2$H$_5$ | 2 | fluorene (CF$_2$) |
| 31 | cyclopentadiene (CH$_2$) | 2NaOC$_2$H$_5$ | 2 | cyclopentadiene (CF$_2$) |
| 32 | indene (CH$_2$) | 2NaOC$_2$H$_5$ | 2 | indene (CF$_2$) |
| 33 | CH$_3$–C(=O)–CH$_2$–C(=O)–CH$_3$ | 2NaOC$_2$H$_5$ | 2 | CH$_3$–C(=O)–CF$_2$–C(=O)–CH$_3$ |

| Example Number | Active Hydrogen Compound | Alkali Metal Base, Moles | Perchloryl Fluoride, Moles | Product |
|---|---|---|---|---|
| 34 | CH$_3$<br>$\|$<br>C=O<br>$\|$<br>CH$_2$<br>$\|$<br>C=O<br>$\|$<br>C$_3$H$_7$ | 2NaOCH$_3$ | 2 | CH$_3$<br>$\|$<br>C=O<br>$\|$<br>CF$_2$<br>$\|$<br>C=O<br>$\|$<br>C$_3$H$_7$ |
| 35 | OCH$_3$<br>$\|$<br>C=S<br>$\|$<br>CH$_2$<br>$\|$<br>C=S<br>$\|$<br>OCH$_3$ | 2NaOC$_2$H$_5$ | 2 | OCH$_3$<br>$\|$<br>C=S<br>$\|$<br>CF$_2$<br>$\|$<br>C=S<br>$\|$<br>OCH$_3$ |

*Example 36*

To 89 g. (0.89 mole) of 2,4-pentanedione in 500 ml. of absolute ethanol were added portionwise 102 g. (1.9 moles) of sodium methylate while adding perchloryl fluoride at a reaction temperature of −10° C. to 0° C. When sufficient perchloryl fluoride had been passed into the mixture to react with all the base present, additional sodium methylate was added in progressively smaller portions, bringing the reaction mixture to the neutral point with perchloryl fluoride before addition of each succeeding portion. The product was 94 g. of 3,3-difluoro-2,4-pentanedione, a colorless liquid; B.P. 114° C. with slow decomposition; 61° C./102 mm.; $n_D^{27}$, 1.3680.

*Analysis.*—Calculated for C$_5$H$_6$F$_2$O$_2$: C, 44.12; H, 4.45. Found: C, 44.33; H, 4.93.

The infrared spectrum showed absorption at 5.71 $\mu$. A strong band at 8.93 $\mu$ was found and is associated with carbonfluorine stretching frequency.

*Example 37*

The 2,4-dinitrophenylhydrazone derivative of 3,3-difluoro-2,4-pentanedione,

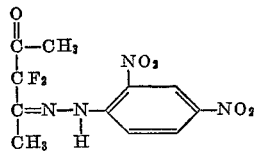

was prepared by reacting 3,3-difluoro-2,4-pentanedione and 2,4-dinitrophenylhydrazine in aqueous alcohol and dilute sulfuric acid at about 20° C.–40° C. Yellow plates of the above product were recovered, M.P. 124–125° C.

*Analysis.*—Calculated for C$_{11}$H$_{10}$F$_2$N$_4$O$_5$: N, 17.72. Found: N, 17.92.

*Example 38*

Using the procedure of Example 36, diethyl 2-phenylmalonate, 87 g. (0.37 mole), in 300 ml. of absolute ethanol, was reacted with perchloryl fluoride while adding 24 g. (0.44 mole) of sodium methylate portionwise. The product was 88 g. of diethyl 2-fluoro-2-phenylmalonate, a colorless oil; B.P. 124°/0.3 mm.; $n_D^{28}$, 1.4792.

*Analysis.*—Calculated for C$_{13}$H$_{15}$FO$_4$: C, 61.41; H, 5.95. Found: C, 61.59; H, 5.88.

Absorption in the infrared spectrum characteristic of the carbonyl linkage appears at 5.69 $\mu$. This compares with absorption at 5.76 $\mu$ in the starting material, diethyl phenylmalonate.

*Example 39*

2-fluoro-2-phenylmalonamide was prepared by reaction of diethyl 2-fluoro-2-phenylmalonate with liquid ammonia containing sodium. White needle crystals, M.P. 204°–205° C.

*Analysis.*—Calculated for C$_9$H$_9$FN$_2$O$_2$: C, 55.10; H, 4.62; N, 14.29. Found: C, 55.42; H, 5.19; N, 14.45.

Diethyl 2-fluoro-2-phenylmalonate, 2-fluoro-2-phenylmalonamide, 3,3-difluoro-2,4-pentanedione and the 2,4-dinitrophenylhydrazone derivative of 3,3-difluoro-2,4-pentanedione are useful intermediates in the preparation of barbiturate type pharmaceutical compounds.

This application is a continuation-in-part of Serial No. 685,807, filed September 24, 1957 abandoned.

Many different embodiments of this invention may be made without departing from the spirit and scope of it, and it is to be understood that our invention includes also such embodiments and is not limited by the above description.

We claim:

1. A method for replacing with fluorine atoms the active hydrogen atoms attached to the alpha carbon atom of an active group of an organic active hydrogen compound having an active group selected from the class consisting of active methylene group and active methinyl group which comprises reacting said active hydrogen compound with an alkali metal base selected from the group consisting of an alkali metal and the alkoxide, hydroxide, hydride and amide of an alkali metal to remove alpha hydrogen from said active group and to substitute therefor alkali metal, thereby forming an alpha alkali metal derivative of said compound, and reacting said derivative with perchloryl fluoride in an amount at least stoichiometrically sufficient to replace each alpha alkali metal atom of said derivative with fluorine atom at a temperature in the range from about −15° C. to about 250° C., thereby forming the alpha fluorine derivative of said active hydrogen compound.

2. A method for forming an alpha fluorine derivative of the active hydrogen compound of claim 1 which comprises reacting an alpha alkali metal derivative of said compound with perchloryl fluoride in an amount at least stoichiometrically sufficient to replace each alpha alkali metal atom of said alkali metal derivative with fluorine atom at a temperature in the range from about −15° C. to about 250° C.

3. The process according to claim 1 in which the alkali metal is sodium.

4. The process according to claim 1 in which the alkali metal derivative is formed in situ.

5. The process according to claim 1 in which the active hydrogen compound is diethyl-2-ethylmalonate.

6. The process according to claim 1 in which the active hydrogen compound is ethyl-2,2-difluoroacetoacetate.

7. The process according to claim 1 in which the active hydrogen compound is diethyl-2-phenylmalonate.

8. The process according to claim 1 in which the active hydrogen compound is 2,4-pentanedione.

9. The process according to claim 1 in which the active hydrogen compound is diethylmalonate.

10. The process of preparing diethyl-2-ethyl-2-fluoromalonate which comprises reacting diethyl-2-ethylmalonate with sodium ethylate and perchloryl fluoride in the molar ratio of about 1:2:2 in ethanol at a temperature ranging from about 0° C. to 10° C.

11. The process of preparing ethyl-2,2-difluoroacetoacetate which comprises reacting ethylacetoacetate with sodium ethylate and perchloryl fluoride in the molar ratio of about 1:2:2 in ethanol at a temperature ranging from about 0° C. to 10° C.

12. The process of preparing diethyl 2-fluoro-2-phenylmalonate which comprises reacting diethyl 2-phenylmalonate with sodium methylate and perchloryl fluoride in the molar ratio of about 1:2:2 in ethanol at a temperature ranging from about −10° C. to 0° C.

13. The process of preparing 3,3-difluoro-2,4-pentanedione which comprises reacting 2,4-pentanedione with sodium methylate and perchloryl fluoride in the molar ratio of about 1:2:2 in ethanol at a temperature ranging from about −10° C. to 0° C.

14. The process of preparing diethyl-2,2-difluoromalonate which comprises reacting diethylmalonate with sodium ethylate and perchloryl fluoride in the molar ratio of about 1:2:2 in ethanol at a temperature ranging from about −10° C. to 0° C.

References Cited in the file of this patent

UNITED STATES PATENTS

| | | |
|---|---|---|
| 1,842,293 | Shonle | Jan. 19, 1932 |
| 2,426,902 | Seymour | Sept. 2, 1947 |
| 2,577,422 | Ladd | Dec. 4, 1951 |
| 2,621,212 | Ladd et al. | Dec. 9, 1952 |
| 2,702,306 | Gall et al. | Feb. 15, 1955 |
| 2,721,201 | Huber | Oct. 18, 1955 |
| 2,765,337 | DeBenneville et al. | Oct. 2, 1956 |
| 2,839,513 | Ahlbrecht et al. | June 17, 1958 |

OTHER REFERENCES

Chem. and Eng. News, page 60, July 13, 1959.

UNITED STATES PATENT OFFICE
CERTIFICATE OF CORRECTION

Patent No. 3,030,408            April 17, 1962

Charles E. Inman et al.

It is hereby certified that error appears in the above numbered patent requiring correction and that the said Letters Patent should read as corrected below.

Column 4, line 3, for "in" read -- is --; column 6, line 61, for "$C_6H_7O$—N" read -- $C_6H_7O_3$—N --; columns 9 and 10, in the table, column 2 thereof and opposite Example Number 23, the structure should appear as shown below instead of as in the patent:

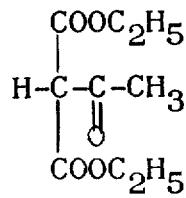

same table, column 5 thereof and opposite Example Number 24, the structure should appear as shown below instead of as in the patent:

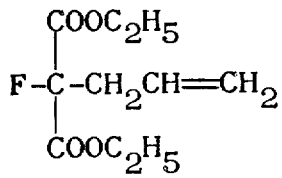

Signed and sealed this 24th day of July 1962.

(SEAL)
Attest:
ERNEST W. SWIDER
Attesting Officer

DAVID L. LADD
Commissioner of Patents